(12) United States Patent
Goino et al.

(10) Patent No.: US 7,714,048 B2
(45) Date of Patent: May 11, 2010

(54) BIODEGRADABLE RESIN COMPOSITION

(75) Inventors: Masaya Goino, Sodegaura (JP);
Yasuhiro Kakida, Sodegaura (JP); Shoji Obuchi, Ichihara (JP)

(73) Assignee: Toho Chemical Industry Co., Ltd., Tokyo (JP)

( * ) Notice: Subject to any disclaimer, the term of this patent is extended or adjusted under 35 U.S.C. 154(b) by 688 days.

(21) Appl. No.: 11/587,524

(22) PCT Filed: Apr. 25, 2005

(86) PCT No.: PCT/JP2005/007849

§ 371 (c)(1),
(2), (4) Date: Oct. 25, 2006

(87) PCT Pub. No.: WO2005/103160

PCT Pub. Date: Nov. 3, 2005

(65) Prior Publication Data

US 2007/0298237 A1 Dec. 27, 2007

(30) Foreign Application Priority Data

Apr. 26, 2004 (JP) ............... 2004-130406

(51) Int. Cl.
*C08K 5/42* (2006.01)
*C08K 5/55* (2006.01)

(52) U.S. Cl. ............ 524/157; 428/34.1; 428/480; 524/159; 524/183

(58) Field of Classification Search ........... 524/157, 524/236, 243, 244, 245, 247, 159, 183; 428/34.1, 428/480
See application file for complete search history.

(56) References Cited

U.S. PATENT DOCUMENTS

| 4,904,825 | A | * | 2/1990 | Govindan | ........... 562/84 |
| 5,053,531 | A | * | 10/1991 | Govindan | ........... 562/114 |
| 5,187,214 | A | * | 2/1993 | Govindan | ........... 524/157 |
| 7,067,571 | B2 | * | 6/2006 | Sato et al. | ........... 524/183 |
| 2002/0161082 | A1 | | 10/2002 | McWilliams et al. | |

FOREIGN PATENT DOCUMENTS

| JP | A 09-194628 | 7/1997 |
| JP | A 09-208742 | 8/1997 |
| JP | A 09-221587 | 8/1997 |
| JP | A 09-278936 | 10/1997 |
| JP | A 10-036650 | 2/1998 |
| JP | A 11-310698 | 11/1999 |
| JP | A 2002-060603 | 2/2002 |
| JP | A 2002-532291 | 10/2002 |
| JP | A 2003-261757 | 9/2003 |
| JP | A 2005-015741 | 1/2005 |
| JP | A 2005-015742 | 1/2005 |
| WO | WO 00/36005 A1 | 6/2000 |

\* cited by examiner

*Primary Examiner*—David Wu
*Assistant Examiner*—Marie Reddick
(74) *Attorney, Agent, or Firm*—Oliff & Berridge PLC

(57) ABSTRACT

A biodegradable resin composition that exhibits excellent antistatic properties and antifogging properties while maintaining its molecular weight to such a degree as to provide practically satisfactory strength of a molded article molded even according to a kneading process.

10 Claims, No Drawings

BIODEGRADABLE RESIN COMPOSITION

TECHNICAL FIELD

The present invention relates to biodegradable resin compositions having imparted properties such as antistatic properties and anti-fogging properties while maintaining satisfactory molecular weights. Specifically, it relates to poly(lactic acid) resin compositions which are renewable or recyclable, plant-derived resources.

BACKGROUND ART

Plastics such as polypropylenes, polyethylenes and poly(vinyl chloride)s derived from fossil resources such as petroleum, are molded typically into food packaging films, electric appliances and industrial materials and are very important materials essential for our livelihood. It is, however, well known that these plastics are not biodegradable, thereby remain in the nature semipermanently after their use, significantly affect an ecosystem, and lead to destruction of environment in various ways.

Under these circumstances, biodegradable resins have received attention. Among them, biodegradable resins prepared from plants (vegetables), namely, plant-derived biodegradable resins are to be used as replacements from fossil resource-derived non-biodegradable plastics. In particular, poly(lactic acid) resins have recently received attention and have been produced increasingly. They have received attention for the following reasons. Social demands have been made on providing cycling systems of matter in which limited fossil resources are saved and thoroughly reused as resources. Under these circumstances, plastics derived from fossil resources are considered to be remarkably out of the cycling systems of matter. In contrast, poly(lactic acid)s are expected to constitute cycling systems of matter, in which the poly(lactic acid)s are recycled as resources, because they are prepared from saccharides derived from plants such as corn and potatoes, or lactic acid as fermented products of such saccharides.

Materials for poly(lactic acid) resins are synthetically prepared from saccharides derived from grains which are recycling capable resources such as corn and potatoes, or lactic acid as fermented products of such saccharides. In addition, poly(lactic acid) resins which become unnecessary are easily hydrolyzed in natural environments and decomposed by the action of microorganisms and ultimately become water and carbon dioxide gas.

Films, sheets, and other molded resinous articles including biodegradable resins such as poly(lactic acid) resins are known to exhibit performance equivalent to that of conventional plastics. Among them, poly(lactic acid) resins have very high transparency and are very usable in packaging uses in which transparency is an important factor. In addition, they have water vapor permeability equal to or better than that of conventional oriented polypropylene (OPP) or oriented polystyrene (OPS) films and are expected to replace these films.

As is described above, biodegradable resins have many advantages and are applicable to molded articles such as films and sheets. However, since they have electrical insulating properties typical to resins, they are very susceptible to being electrically charged as in regular resins, and thereby they have various problems due to electrical charges. Such problems include, for example, crawling of ink upon printing, flying out of contents to be packaged upon packaging, and dust adhesion to products to impair appearance of the products.

Biodegradable resins also have problems caused by low hydrophilicity typical to plastics. For example, films for food packaging should have transparency so as to see the appearance of food packaged therein, but the surfaces of such films become fogged due to water drops derived from water vapor from the food.

To solve these problems, a kneading process of previously adding a surfactant to a resin has been employed. According to the kneading process, the surfactant bleeds out from the inside to the surface of the resulting molded article to form a surfactant layer, and thereby exhibits performance such as antistatic properties and antifogging properties. These properties may sustain to some extent even when the surfactant at surface is wiped off, because the surfactant in the inside of the resin bleeds out again to thereby recover the properties. As is described above, the performance is exhibited as a result of bleedout of the surfactant from the resin according to the kneading process. However, the degree of bleedout is believed to vary significantly depending on the crystallinity of the resin, such as degree of crystallization and degree of orientation of crystals, and the compatibility (miscibility) between the resin and the surfactant. Among such factors, the crystallinity of the resin and the compatibility of the surfactant also significantly affect the appearance of the resin.

Patent Document 1 demonstrates that a polyhydric alcohol and a fatty acid ester thereof are incorporated into a poly(lactic acid) resin to provide antistatic films and sheets. Patent Document 2 describes that antistatic properties are imparted to a poly(lactic acid) by containing a nonionic surfactant including a glycerol fatty acid ester. Patent Document 3 shows that antistatic properties are imparted to a caprolactone resin as a biodegradable resin by containing a nonionic surfactant including a glycerol fatty acid ester. Patent Document 4 demonstrates that antistatic properties are exhibited while suppressing deterioration in transparency due to an alkylsulfonate salt by containing an alkylsulfonate salt of a nonionic surfactant in combination with a polyhydric alcohol or a fatty acid alkylolamide compound. The resulting resins prepared according to these techniques, however, do not have practically sufficient antistatic properties yet. Such surfactants having poor compatibility with resins also markedly affect the appearance of the resins and, in particular, significantly impair the transparency of poly(lactic acid)s that are featured by transparency.

Patent Document 1: Japanese Patent Application Laid-open No. Hei 9-221587 (pages 1 to 9)

Patent Document 2: Japanese Patent Application Laid-open No. Hei 10-36650 (pages 1 to 14)

Patent Document 3: Japanese Patent Application Laid-open No. 2002-60603 (pages 1 to 5)

Patent Document 4: Japanese Patent Application Laid-open No. 2003-261757(pages 1 to 6)

Patent Document 5: Japanese Patent Application Laid-open No. Hei 9-278936(pages 1 to 14)

DISCLOSURE OF INVENTION

Problems to be Solved by the Invention

Under these circumstances, an object of the present invention is to provide a biodegradable resin composition that is capable of exhibiting excellent antistatic properties and antifogging properties while maintaining its molecular weight to such an extent that the resulting molded article shows practically satisfactory strength even molded by a kneading process.

Means for Solving the Problems

After intensive investigations to achieve the object, the present inventors have found that a biodegradable resin composition having excellent antistatic properties and antifogging properties while maintaining its molecular weight is obtained by incorporating a surfactant containing counter ions having at least one $SO_3^-$ group and at least one COOR group into a biodegradable resin.

Specifically, the present invention provides a biodegradable resin composition containing a surfactant represented by following General Formula (A). The present invention further provides a biodegradable resin composition containing the surfactant and at least one compatibilizer in a ratio of the surfactant to the compatibilizer of 90:10 to 10:90 (percent by weight), wherein the at least one compatibilizer is selected from reaction products between boric acid and at least one selected from the group consisting of monohydric alcohols, alkylphenols, and polyhydric alcohols such as glycerol, diglycerol, polyglycerols, ethylene glycol, propylene glycol, sorbitol, sorbitan, pentaerythritol, trimethylolpropane and sucrose (hereinafter these are referred to as "alcohols (b)"); reaction products between boric acid and fatty acid esters derived from the alcohols (b) and fatty acids; reaction products between boric acid and alkylene oxide adducts of the alcohols (b); and reaction products between boric acid and fatty acid esters derived from fatty acids and alkylene oxide adducts of the alcohols (b).

[Chemical Formla 1]

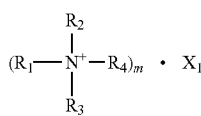
(A)

[wherein $R_1$, $R_2$, $R_3$, and $R_4$ are the same as or different from one another and each represent a straight- or branched-chain alkyl group, alkenyl group, hydroxyalkyl group, alkylaryl group, arylalkyl group, each of which has one to thirty carbon atoms, $-(A_1O)_f-R_a$ group (wherein $A_1$ represents an alkylene group having two to four carbon atoms; "f" denotes 1 to 50; and $R_a$ represents a straight- or branched-chain alkyl group, alkenyl group, hydroxyalkyl group or alkylaryl group, each of which has one to thirty carbon atoms) or a group represented by following General Formula (A'):

$$R_5-X_2-R_6- \qquad (A')$$

(wherein $R_5$ represents a straight- or branched-chain alkyl group, alkenyl group, hydroxyalkyl group or alkylaryl group, each of which has one to thirty carbon atoms; $R_6$ represents an alkylene group having one to thirty carbon atoms; and $X_2$ represents —C(=O)NH—, —NHC(=O)—, —C(=O)O—, —OC(=O)— or —O—);

$X_1$ represents a structure having at least one of $SO_3^-$ group and $COOR_7$ group {wherein $R_7$ represents a straight- or branched-chain alkyl group, alkenyl group, hydroxyalkyl group, alkylaryl group, each of which has one to thirty carbon atoms, or $-(A_2O)_g-R_b$ group (wherein $A_2$ represents an alkylene group having two to four carbon atoms; "g" denotes 1 to 50; and $R_b$ represents a straight- or branched-chain alkyl group, alkenyl group, hydroxyalkyl group or alkylaryl group, each of which has one to thirty carbon atoms)}; and "m" denotes an integer of 1 or more].

In preferred embodiment of the biodegradable resin compositions according to the present invention, $X_1$ is represented by following General Formula (B):

[Chemical Formula 2]

$$R_8OOC-(CH_2)_p-(CHSO_3^-)_q-COOR_9 \qquad (B)$$

[wherein $R_8$ and $R_9$ are the same as or different from each other and each represent a straight- or branched-chain alkyl group, alkenyl group, hydroxyalkyl group, alkylaryl group, each of which has one to thirty carbon atoms, $-(A_3O)_h-R_c$ group (wherein $A_3$ represents an alkylene group having two to four carbon atoms; "h" denotes 1 to 50; and $R_c$ represents a straight- or branched-chain alkyl group, alkenyl group, hydroxyalkyl group, alkylaryl group, each of which has one to thirty carbon atoms), hydrogen atom, an alkali metal, an alkaline earth metal, ammonium or phosphonium (wherein $R_8$ and $R_9$ do not simultaneously represent hydrogen atoms, alkali metals, alkaline earth metals, ammoniums or phosphoniums); and "p" and "q" each represent an integer of 1 or more, and the total of "p" and "q" is an integer of 2 or more, and wherein the $CH_2$ group and $CHSO_3^-$ group may be arranged at random or in block].

In a further preferred embodiment of the biodegradable resin composition according to the present invention, $X_1$ is represented by following General Formula (C):

[Chemical Formula 3]

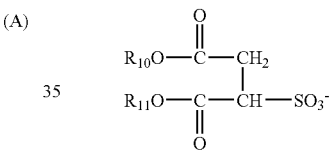
(C)

wherein $R_{10}$ and $R_{11}$ are the same as or different from each other and each represent a straight- or branched-chain alkyl group, alkenyl group, hydroxyalkyl group, alkylaryl group, each of which has one to thirty carbon atoms, $-(A_4O)_i-R_d$ group (wherein $A_4$ represents an alkylene group having two to four carbon atoms; "i" denotes 1 to 50; and $R_d$ represents a straight- or branched-chain alkyl group, alkenyl group, hydroxyalkyl group or alkylaryl group, each of which has one to thirty carbon atoms), hydrogen atom, an alkali metal, an alkaline earth metal, ammonium or phosphonium (wherein $R_{10}$ and $R_{11}$ do not simultaneously represent hydrogen atoms, alkali metals, alkaline earth metals, ammoniums or phosphoniums.

Effect Of The Invention

The biodegradable resins containing a specific surfactant or surfactant composition according to embodiments of the present invention may exhibit excellent antistatic properties and antifogging properties. In addition, they maintain their molecular weights significantly as compared with regular biodegradable resins containing known surfactants. Accordingly, molded articles molded from the biodegradable resins, such as films or sheets, injection-molded articles, filaments, nonwoven fabrics, bottles, and yarns, have sufficient strength and are preferably useable as materials in wide ranges, such as (food) packaging materials, agricultural, constructional and marine-product materials, and compost materials.

Best Mode For Carrying Out The Invention

The present invention will be illustrated in detail below.

The present invention relates to biodegradable resin compositions which contain the surfactant represented by General Formula (A) or a surfactant composition including the surfactant and the compatibilizer and are excellent in antistatic properties and antifogging properties.

Preferred embodiments of the surfactant for use in the present invention will be illustrated below.

The substituents $R_1$, $R_2$, $R_3$ and $R_4$ in General Formulae (A), (B) and (C) are the same as or different from one another and each represent, for example, an alkyl group having one to thirty carbon atoms. For increasing the thermal stability of the surfactant, at least one of these substituents is preferably a straight- or branched-chain alkyl group, alkenyl group, hydroxyalkyl group, each of which has twelve to twenty-two carbon atoms, $-(AO)_k-R_a$ group or General Formula (A').

In $-(A_1O)_f-R_a$, $-(A_2O)_g-R_b$, $-(A_3O)_h-R_cC$ and $-(A_4O)_i-R_d$ groups, $A_1$, $A_2$, $A_3$ and $A_4$ are each an alkylene group having two to four carbon atoms, of which ethylene group and propylene group are preferred. The numbers "f", "g", "h", and "i" are each 1 to 50, of which a number of 1 to 10 is preferred. The substituents $R_a$, $R_b$, $R_c$ and $R_d$ each represent, for example, an alkyl group having one to thirty carbon atoms, of which a straight- or branched-chain alkyl group or alkenyl group having one to twenty-two carbon atoms is preferred.

In General Formula (A'), $R_5$ represents, for example, an alkyl group having one to thirty carbon atoms. Among such substituents as $R_5$, those having one to twenty-four carbon atoms are preferred, of which alkyl groups and alkenyl groups having twelve to twenty-two carbon atoms are more preferred.

The substituent $R_6$ is an alkylene group having one to thirty carbon atoms. It is preferably an alkylene group having one to ten carbon atoms, and is more preferably methylene group, ethylene group or propylene group.

Of the groups as $X_2$, —C(=O)NH—, —C(=O)O— and —OC(=O)— are preferred, of which —C(=O)NH— is more preferred.

The substituent $R_7$ in the $COOR_7$ group as $X_1$ represents, for example, an alkyl group having one to thirty carbon atoms. Of such substituents as $R_7$, those having one to twenty-four carbon atoms are preferred, of which alkyl groups and alkenyl groups having twelve to twenty-two carbon atoms are more preferred.

The repetition number "m" denotes an integer of 1 or more. It is preferably, but is not limited to, such an integer that the valency of an anionic moiety is equivalent to that of a cationic moiety. The number "m" is preferably 1 to 10.

The numbers "p" and "q" in General Formula (B) each represent an integer of 1 or more, and the total of "p" and "q" is an integer of 2 or more. These integers are not limited in their upper limits, but "p" and "q" are each preferably 1 to 10.

The $CH_2$ group and $CHSO_3^-$ group may be arrayed at random or in block, because these arrangements may not adversely affect the advantages.

The substituents $R_8$ and $R_9$, or $R_{10}$ and $R_{11}$ in General Formulae (B) and (C) are the same as or different from one another and each represent a straight- or branched-chain alkyl group, alkenyl group, hydroxyalkyl group, alkylaryl group, each of which has one to thirty carbon atoms, $-(A_3O)_h-R_c$ group or $-(A_4O)_i-R_d$ group, hydrogen atom (inclusive of its dissociation state, namely, $COO^-$), an alkali metal, an alkaline earth metal, ammonium or phosphonium. These substituents are each preferably one of alkyl groups, alkenyl groups, hydroxyalkyl groups, each of which has one to twenty-four carbon atoms, and alkali metals, (wherein $R_8$ and $R_9$, or $R_{10}$ and $R_{11}$ do not simultaneously represent hydrogen atoms, alkali metals, alkaline earth metals, ammoniums or phosphoniums).

The alkali metals and alkaline earth metals include, for example, sodium, potassium, calcium and magnesium. The ammoniums include ammonium in the narrow meaning, and organic ammoniums such as diethanolammonium and alkyldiethanolammonium. The phosphoniums include phosphonium in the narrow meaning, and organic phosphoniums such as tetraalkylphosphoniums. Among them, sodium is preferred.

Surfactants for use in the present invention may be synthetically prepared according to a known procedure. Processes for preparing them include, but are not limited to, (1) a process of directly converting an amine into a quaternary form using a sulfosuccinic ester such as methyl dioctylsulfosuccinate or methyl dioctylpolyoxyethylenesulfosuccinate, and (2) a process of converting an amine into a quaternary ammonium salt using a quaternary-converting agent such as methyl chloride, methyl bromide, methyl sulfate, dimethyl sulfate or diethyl sulfate, subjecting the quaternary ammonium salt to salt exchange with a sulfosuccinate salt anionic surfactant having $SO_3^-$ group and COOR group, such as sodium dioctylsulfosuccinate or sodium dipolyoxyethyleneoctylsulfosuccinate, and removing inorganic salts such as sodium chloride and sodium sulfate. Of these processes, the latter process is preferred, because it is less liable to decompose the resulting biodegradable resin because of remained materials after reactions.

Preferred surfactants for use in the present invention include, but are not limited to, the following surfactants:

Surfactant (1)
[Chemical Formula 4]

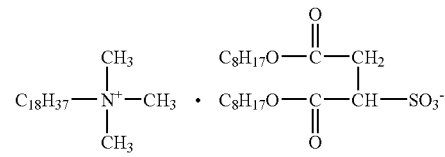

Surfactant (2)
[Chemical Formula 5]

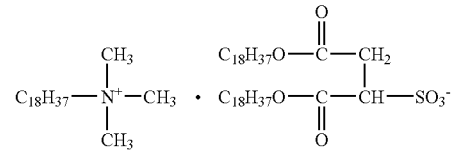

Surfactant (3)
[Chemical Formula 6]

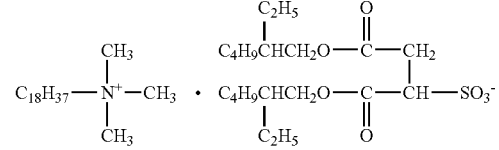

Surfactant (4)
[Chemical Formula 7]

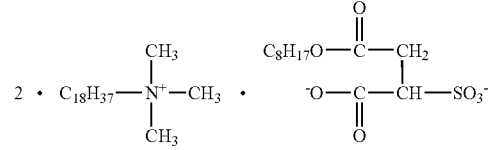

-continued

Surfactant (5)
[Chemical Formula 8]

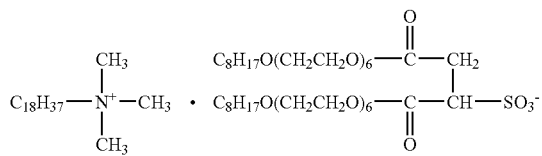

Surfactant (6)
[Chemical Formula 9]

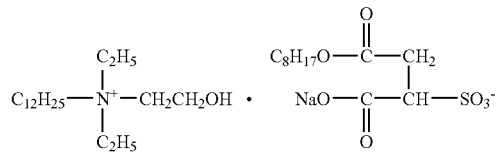

Surfactant (7)
[Chemical Formula 10]

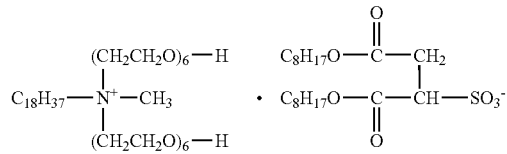

Surfactant (8)
[Chemical Formula 11]

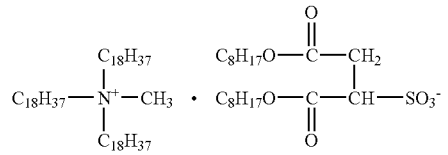

Surfactant (9)
[Chemical Formula 12]

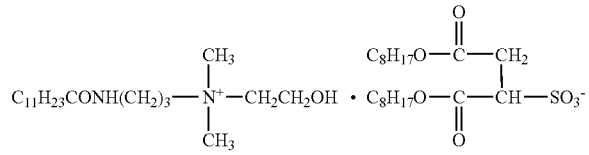

The content of the surfactant or surfactant composition in the biodegradable resin according to the present invention is preferably 0.05 percent by weight to 10.0 percent by weight, more preferably 0.1 percent by weight to 5.0 percent by weight, and further preferably 0.5 percent by weight to 2.0 percent by weight. The antistatic properties are improved with an increasing content of the surfactant or surfactant composition for use in an embodiment of the present invention. However, the surfactant or surfactant composition in a content exceeding 10.0 percent by weight may not significantly improve the antistatic properties, but may invite high cost due to excessive addition of the surfactant or surfactant composition and may affect the mechanical properties of the biodegradable resin.

The surfactant or surfactant composition for use in the present invention is preferably dried before use, for preventing the hydrolysis due to moisture of biodegradable resins. The water content of the surfactant or surfactant composition for use in the present invention is preferably 1.0 percent by weight or less.

The surfactant relating to the present invention may be used alone in the biodegradable resins, but also may be used in combination with one or more other known surfactants such as anionic surfactants, cationic surfactants, nonionic surfactants and amphoteric surfactants.

The surfactant relating to the present invention may also be used by applying the same to a surface of plastic product, so as to impart antistatic properties and antifogging properties to the product, which is an object of the present invention. It can be used, for example, according to a known or conventional procedure. For example, it is acceptable that the surfactant is diluted with a solvent, such as ethanol or isopropyl alcohol, to about 50 to about 100 times, and the diluted solution is applied using an atomizer or bar coater. The applying process, however, is not specifically limited.

Biodegradable resins relating to embodiments of the present invention will be illustrated below.

The biodegradable resins for use in the present invention are biodegradable thermoplastic resins, and they include aliphatic polyesters and aromatic polyesters containing, for example, at least one selected from hydroxycarboxylic acids, aliphatic polyhydric alcohols, aromatic polyhydric alcohols, aliphatic polycarboxylic acids and aromatic polycarboxylic acids.

They may be in the form of homopolymers and copolymers, such as random copolymers, block copolymers and comb copolymers. Examples thereof include after-mentioned poly(lactic acid) resins, poly(ethylene succinate) resins, poly(ethylene succinate adipate) resins, poly(butylene succinate) resins, poly(butylene succinate adipate) resins, poly(butylene succinate carbonate) resins, poly(ethylene carbonate) resins, poly(ethylene terephthalate adipate) resins, poly(butylene succinate terephthalate) resins, poly(butylene adipate terephthalate) resins, polycaprolactone resins, and poly(glycolic acid) resins.

Among them, the after-mentioned poly(lactic acid) resins, as well as poly(lactic acid)s, polycaprolactones, poly(butylene succinate)s, poly(butylene succinate adipate)s, poly(butylene terephthalate adipate)s and poly(ethylene terephthalate adipate)s are preferred, because they are commercially available and may be easily obtained at low cost.

Monomer units constituting these may be chemically modified. The biodegradable resins may be copolymers each comprising different two or more monomers. They may also be copolymers between monomer mixtures constituting the above-mentioned resins and at least one selected from hydroxycarboxylic acids such as glycolic acid and 3-hydroxybutyric acid; polycarboxylic acids such as succinic acid and adipic acid; polysaccharides such as cellulose acetate and ethyl cellulose; and polyhydric alcohols such as ethylene glycol and diethylene glycol. The biodegradable resins may further contain, for example, any of starch resins, chitosan resins, poly(vinyl alcohol) resins and petroleum resins, within ranges not adversely affecting the object of the present invention.

The molecular weights of biodegradable resins for use in the present invention in terms of weight-average molecular weight (Mw) are preferably 60000 to 1000000, more preferably 80000 to 500000, and most preferably 100000 to 300000. In general, molded articles prepared by forming the resin compositions may have insufficient mechanical properties if the weight-average molecular weight (Mw) is less than 60000. In contrast, the resin compositions may show excessively high melt viscosity upon forming and thus become difficult to treat or become economically disadvantageous in production, if the molecular weight exceeds 1000000.

The molecular weight distribution (Mw/Mn) of the resins is not specifically limited, as long as the resulting resins are substantially capable of molding and have substantially sufficient mechanical properties. It is generally preferably 1.5 to 8, more preferably 2 to 6, and most preferably 2 to 5.

The term "poly(lactic acid) resin" used herein means a polymer composition mainly containing a polymer having lactic acid units in a content of 50 percent by weight or more, and preferably 75 percent by weight or more. Lactic acids for use as materials may be L-lactic acid, D-lactic acid, DL-lactic acid, mixtures thereof, or a lactide as a cyclic dimer of lactic acid. The term "poly(ethylene succinate) resin" means a polymer composition mainly containing a polymer having ethylene succinate units in a content of 50 percent by weight or more, and preferably 75 percent by weight or more. These are also true for the other biodegradable resins listed above.

[Content of Lactic Acid Unit in Poly(Lactic Acid) Resins]

Lactic acid units in poly(lactic acid) resins may be present in the form of L-lactic acid, D-lactic acid and mixtures of these. The form of lactic acid unit may be appropriately selected according to the use. A poly(lactic acid) mainly containing L-lactic acid, if used as the poly(lactic acid) resin, preferably contains D-lactic acid and L-lactic acid in a ratio of the former to the latter of 1:99 to 30:70. The poly(lactic acid) resin may contain a blend of two or more poly(lactic acid)s having different proportions of D-lactic acid and L-lactic acid. In contrast, a poly(lactic acid) mainly containing D-lactic acid, if used as the poly(lactic acid) resin, preferably contains L-lactic acid and D-lactic acid in a ratio of the former to the latter of 1:99 to 30:70. The poly(lactic acid) resin may contain a blend of two or more poly(lactic acid)s having different proportions of D-lactic acid and L-lactic acid.

The resins may further contain, as other components, one or more of aliphatic hydroxycarboxylic acids having two to ten carbon atoms other than lactic acid, aliphatic dicarboxylic acids, and aliphatic diols within ranges not adversely affecting the objects of the present invention. They may also contain aromatic compounds such as terephthalic acid. They may contain homopolymers and copolymers mainly containing these compounds, and mixtures of these. The resins may further contain other resins within ranges not adversely affecting the properties obtained according to embodiments of the present invention.

The biodegradable resins for use in the present invention may be produced according to a known procedure.

Poly(lactic acid) resins preferably used in embodiments of the present invention are produced, for example, according to a known process such as a process of subjecting lactic acid directly to dehydration polycondensation or a process of subjecting lactide, a cyclic dimer of lactic acid, to ring-opening polymerization. However, the production process is not limited to these. Production processes of poly(lactic acid) resins include, but are not limited to, known or generally used processes, such as:

(1) a process of subjecting lactic acid or a mixture of lactic acid and an aliphatic hydroxycarboxylic acid as a material directly to dehydration polycondensation (e.g., the production process disclosed in U.S. Pat. No. 5,310,865);

(2) a process of ring-opening polymerization in which a cyclic dimer of lactic acid (lactide) is melted and polymerized (e.g., U.S. Pat. No. 2,758,987);

(3) a process of ring-opening polymerization in which cyclic dimers of lactic acid and an aliphatic hydroxycarboxylic acid, such as lactide or glycolide and ε-caprolactone, are subjected to melt polymerization in the presence of a catalyst (e.g., the production process disclosed in U.S. Pat. No. 4,057,537);

(4) a process of subjecting a mixture of lactic acid, an aliphatic dihydric alcohol and an aliphatic dibasic acid directly to dehydration polycondensation (e.g., the production process disclosed in U.S. Pat. No. 5,428,126);

(5) a process of subjecting a poly(lactic acid) and a polymer derived from an aliphatic dihydric alcohol and an aliphatic dibasic acid to condensation in the presence of an organic solvent (e.g., the production process disclosed in EP 0712880 A2); and (6) a process of producing a polyester by subjecting lactic acid to dehydration polycondensation in the presence of a catalyst, in which solid-phase polymerization is carried out at least in part of the steps.

The resins may be produced by copolymerization in the coexistence of a small amount of an aliphatic polyhydric alcohol such as trimethylolpropane or glycerol, an aliphatic polybasic acid such as butanetetracarboxylic acid, and/or a polyhydric alcohol such as a polysaccharide. The molecular weights of the resins may be increased by using a binding agent (polymer-chain extender) such as a diisocyanate compound.

The biodegradable resins for use in the present invention may further contain additional components within ranges not adversely affecting the objects of the present invention. Such additional components include additives, modifiers, and fillers, including plasticizers, compatibilizers, antioxidants, lubricants, colorants, ultraviolet absorbers, photo-stabilizers, pigments, and inorganic fillers.

The biodegradable resins for use in the present invention may further contain other resins than the above-exemplified biodegradable resins within ranges not adversely affecting the objects of the present invention. Such other resins (other components) include, for example, resins derived from fossil resources, such as polypropylenes, polyethylenes, and poly(vinyl chloride)s.

Before biodegradable resins are heated and processed, they are preferably dried so as to prevent hydrolysis caused by water.

The surfactant or surfactant composition for use in the present invention may be added according to a known procedure. In general, the surfactant or surfactant composition is mixed with a biodegradable resin in the form of powder or pellets typically using a ribbon blender, the mixture (composition) is extruded into pellets using a single-screw extruder or twin-screw extruder, and the resulting pellets are subjected to forming (molding).

Examples of the molding process include (1) a process of feeding the pellets obtained by the above-mentioned process to a molding machine, (2) a process of melting and kneading the pellets of the biodegradable resin by a twin-screw extruder while feeding the surfactant or surfactant composition concurrently, and feeding the kneaded product to a molding machine, and (3) a process of preparing a biodegradable resin composition containing a high content of the surfactant or surfactant composition to yield a master batch for modification, mixing and diluting the master batch with pellets of the biodegradable resin, and feeding the mixture to a molding machine.

The master batch process (3) is often employed because it is economically advantageous. While varying depending on the content of the surfactant or surfactant composition in the master batch, the master batch for modification is generally diluted to 2 to 50 times, preferably 3 to 40 times, more preferably 5 to 30 times, and further preferably 7 to 30 times. Within this range of dilution, the surfactant may be homogeneously dispersed.

A compatibilizer for improving the compatibility between the biodegradable resin and the surfactant is preferably used upon the preparation of a master batch having a high concentration. By adding a compatibilizer upon melting and kneading of the biodegradable resin and the surfactant, the melting and kneading procedure at a high concentration can be carried out, and the resulting pellets have improved storage stability.

Preferred embodiments of the compatibilizer for use in the present invention will be described below.

The term "compatibilizer" for use in the present invention refers to at least one compound selected from reaction products between boric acid and at least one selected from the group consisting of monohydric alcohols, alkylphenols and polyhydric alcohols such as glycerol, diglycerol, polyglycerols, ethylene glycol, propylene glycol, sorbitol, sorbitan, pentaerythritol, trimethylolpropane and sucrose (hereinafter these are referred to as "alcohols (b)"); reaction products between boric acid and fatty acid esters derived from the alcohols (b) and fatty acids; reaction products between boric acid and alkylene oxide adducts of the alcohols (b); and reaction products between boric acid and fatty acid esters derived from fatty acids and alkylene oxide adducts of the alcohols (b). Examples thereof include reaction products between boric acid and ester compounds, such as reaction products between boric acid and higher alcohol fatty acid esters, reaction products between boric acid and alkylphenol fatty acid esters, reaction products between boric acid and glycerol fatty acid esters, reaction products between boric acid and diglycerol fatty acid esters, reaction products between boric acid and polyglycerol fatty acid esters, reaction products between boric acid and sorbitol fatty acid esters, reaction products between boric acid and sorbitan fatty acid esters, reaction products between boric acid and pentaerythritol fatty acid esters, reaction products between boric acid and trimethylolpropane fatty acid esters, reaction products between boric acid and sucrose fatty acid esters and reaction products between boric acid and citric acid fatty acid esters; reaction products between boric acid and ether compounds, such as reaction products between boric acid and polyalkylene glycols, reaction products between boric acid and polyoxyalkylene alkyl ethers, reaction products between boric acid and polyoxyalkylene alkylphenyl ethers, reaction products between boric acid and polyoxyethylene polyoxypropylene glycol ethers, reaction products between boric acid and polyoxyalkylene glycerol ethers, reaction products between boric acid and polyoxyalkylene diglycerol ethers, reaction products between boric acid and polyoxyalkylene sorbitol ethers, reaction products between boric acid and polyoxyalkylene sorbitan ethers, reaction products between boric acid and polyoxyalkylene pentaerythritol ethers, reaction products between boric acid and polyoxyalkylene trimethylolpropane ethers and reaction products between boric acid and polyoxyalkylene sucrose ethers; and reaction products between boric acid and ester/ether compounds, such as reaction products between boric acid and polyoxyalkylene fatty acid esters, reaction products between boric acid and polyoxyalkylene alkylphenol fatty acid esters, reaction products between boric acid and polyoxyalkylene glycol fatty acid esters, reaction products between boric acid and polyoxyalkylene glycerol fatty acid esters, reaction products between boric acid and polyoxyalkylene diglycerol fatty acid esters, reaction products between boric acid and polyoxyalkylene polyglycerol fatty acid esters, reaction products between boric acid and polyoxyalkylene sorbitol fatty acid esters, reaction products between boric acid and polyoxyalkylene sorbitan fatty acid esters, reaction products between boric acid and polyoxyalkylene pentaerythritol fatty acid esters, reaction products between boric acid and polyoxyalkylene trimethylolpropane fatty acid esters and reaction products between boric acid and polyoxyalkylene sucrose fatty acid esters.

The compatibilizers are derivatives from monohydric alcohols, alkylphenols, and polyhydric alcohols, such as glycerol, diglycerol, polyglycerols, ethylene glycol, propylene glycol, sorbitol, sorbitan, pentaerythritol, trimethylolpropane, and sucrose. The compatibilizers are preferably derivatives of glycerol, diglycerol and sorbitan. Each of these may be used alone or in combination.

The reaction products between boric acid and fatty acid esters, and reaction products between boric acid and fatty acid esters of alkylene oxide adducts in the compatibilizers may be synthetically prepared according to a known procedure from fatty acids and fatty acid derivatives each having a straight- or branched-chain alkyl group, alkenyl group, or hydroxyalkenyl group each having one to thirty carbon atoms. The fatty acids and fatty acid derivatives preferably have at least one of straight-chain alkyl group and alkenyl group each having twelve to twenty-two carbon atoms, for improved thermal stability.

The alkylene oxides in the reaction products between boric acid and fatty acid esters, and reaction products between boric acid and fatty acid esters of alkylene oxide adducts in the compatibilizers are preferably ethylene oxide and/or propylene oxide. The number of moles of added alkylene oxide is not specifically limited, but preferably 1 moles to 50 moles, and more preferably 10 moles to 30 moles of an alkylene oxide may be added.

The compatibilizers are reaction products with boric acid. The molar ratio of boric acid to be reacted is preferably 0.1 mole to 2.0 moles, more preferably 0.25 mole to 1.0 mole, and more preferably 0.5 mole to 0.7 mole.

The reaction products between boric acid and fatty acid esters of alkylene oxide adducts may be obtained according to a known process. The process includes, but is not limited to, (1) a process of esterifying a polyhydric alcohol, such as glycerol or sorbitol, with a fatty acid, adding an alkylene oxide to the resulting ester compound, and allowing the adduct to react with boric acid; and (2) a process of adding an alkylene oxide to a polyhydric alcohol, esterifying the adduct with a fatty acid, and allowing the ester compound to react with boric acid. In a more specific example, 1 mole of sorbitol is allowed to react with 1 mole of stearic acid to yield an ester compound; 20 moles of ethylene oxide is added to the ester compound to yield polyoxyethylene(20) sorbitol monostearate; 1 mole of boric acid is allowed to react with this to thereby yield a reaction product between boric acid and polyoxyethylene(20) sorbitol monostearate.

Specific examples of the compatibilizers include, but are not limited to, a reaction product between boric acid and stearyl monostearate, a reaction product between boric acid and octylphenol monostearate, a reaction product between boric acid and glycerol monolaurate, a reaction product between boric acid and glycerol monostearate, a reaction product between boric acid and glycerol distearate, a reaction product between boric acid and glycerol sesquioleate, a reaction product between boric acid and glycerol monohydroxystearate, a reaction product between boric acid and diglycerol monostearate, a reaction product between boric acid and diglycerol dioleate, a reaction product between boric acid and triglycerol monolaurate, a reaction product between boric acid and decaglycerol monostearate, a reaction product between boric acid and ethylene glycol monostearate, a reaction product between boric acid and propylene glycol dioleate, a reaction product between boric acid and sorbitol monooleate, a reaction product between boric acid and sorbitan monostearate, a reaction product between boric acid and sorbitan monooleate, a reaction product between boric acid and pentaerythritol monolaurate, a reaction product between boric acid and trimethylolpropane monostearate, a reaction product between boric acid and sucrose monostearate, a reaction product between boric acid and polyoxyethylene(5) glycerol, a reaction product between boric acid and polyoxyethylene(3) diglycerol, a reaction product between boric acid and polyoxypropylene(5) triglycerol, a reaction product between boric acid and polyoxyethylene(2) glycol, a reaction product between boric acid and polyoxypropylene(3) glycol, a reaction product between boric acid and polyoxyethylene (5) sorbitol, a reaction product between boric acid and polyoxyethylene(5) sorbitan, a reaction product between boric acid and polyoxypropylene(3) pentaerythritol, a reaction product between boric acid and polyoxyethylene(3) trimethylolpropane, a reaction product between boric acid and polyoxyethylene(3) sucrose, a reaction product between boric acid and polyoxyethylene(20) glycerol monolaurate, a reaction product between boric acid and polyoxypropylene(20) glycerol monostearate, a reaction product between boric acid and polyoxyethylene(20) diglycerol monooleate, a reaction product between boric acid and polyoxyethylene(5) triglycerol dioleate, a reaction product between boric acid and polyoxyethylene(10) glycol monostearate, a reaction product between boric acid and polyoxypropylene(30) glycol monolaurate, a reaction product between boric acid and polyoxyethylene(10) sorbitol monolaurate, a reaction product between boric acid and polyoxyethylene(20) sorbitan monostearate, a reaction product between boric acid and polyoxypropylene(10) sorbitan monolaurate, a reaction product between boric acid and polyoxyethylene(20) pentaerythritol monostearate, a reaction product between boric acid and polyoxyethylene(10) trimethylolpropane monooleate, and a reaction product between boric acid and polyoxyethylene(5) sucrose distearate.

The amount of the compatibilizer, if incorporated into the surfactant represented by General Formula (A) for use in the present invention, is preferably 10 percent by weight to 90 percent by weight, more preferably 25 percent by weight to 75 percent by weight, and further preferably 40 percent by weight to 60 percent by weight, based on the total amount of the surfactant composition. If the amount of the compatibilizer is less than 10 percent by weight, the compatibility with biodegradable resins becomes too low to yield a high-concentration master batch. If it is more than 90 percent by weight, the resulting resin composition may have decreased antistatic properties.

The biodegradable resin composition containing a high concentration of the surfactant composition including the surfactant and the compatibilizer (master batch) is preferably one containing 1 to 100 parts by weight, preferably 2 to 50 parts by weight, and further preferably 5 to 30 parts by weight, of the surfactant composition relative to 100 parts by weight of a biodegradable resin. The kneading of the master batch with a biodegradable resin may be carried out according to a known kneading procedure.

[Molded Articles and Production Method thereof]

Biodegradable resin compositions relating to the present invention are suitable materials that may be applied to known or generally-used molding processes. Molded articles to be prepared are not specifically limited and include, for example, films/sheets, monofilaments, multifilaments such as fibers and nonwoven fabrics, injection-molded articles, blow-molded articles, laminates (assemblages), foamed articles, vacuum formings, and other thermoformed articles.

The biodegradable resin compositions relating to the present invention are suitable for the production of oriented (stretched) articles such as films/sheets, tape yarns, oriented blow molded articles, and monofilaments or multifilaments, because they have good moldability upon orientation and crystallization and significantly exhibit advantages according to the present invention.

To yield molded articles, the biodegradable resin compositions relating to the present invention may be applied to any molding process. Examples of such molding processes include injection molding, blow molding (injection drawing blowing, extrusion drawing blowing, and direct blowing), balloon process, inflation molding, coextrusion, calendering, hot pressing, solvent casting, (drawing) extrusion molding, extrusion lamination with paper or aluminum, profile extrusion molding, vacuum forming (or air-pressure forming) and other thermoforming processes, melt spinning (e.g., monofilament, multifilament, span bonding, melt blowing, and fibrillated film yarn process), foaming molding and compression molding.

Among them, molding processes which can include a step of orienting and crystallizing, such as extrusion molding and melt spinning, are preferred, because these molding processes may improve strength, thermal stability, impact resistance, transparency and other practical strength, and appearance of the resulting molded articles.

Molded articles obtained from the biodegradable resin compositions relating to the present invention include, for example, molded articles obtained as a result of known or generally-used molding processes, and their shapes, sizes, thickness, designs and other parameters are not specifically limited.

SPECIFIC EXAMPLES OF USES

The biodegradable resin compositions may be subjected to the molding processes to yield molded articles such as bottle molded articles, film or sheet molded articles, hollow tubes, laminates, vacuum (or air-pressure) formed vessels, mono- or multi-filaments, nonwoven fabrics, and foamed molded articles. The resulting molded articles are advantageously usable as wide varieties of materials, such as packaging films typically for food, electronics, medical products, pharmaceutical products and cosmetics; and materials for use in the field of electrical manufacture, automobile manufacture, agriculture, civil engineering, and fisheries. Specific examples thereof include shopping bags, paper bags, shrink films, food wrap films, cosmetic/fragrance wrap films, diapers, sanitary napkins, pharmaceutical wrap films, wrap films for pharmacy, wrap films for surgical patches applied typically to shoulder stiffness, agricultural/horticultural films, wrap films for agricultural drugs, films for greenhouse, fertilizer bags, packaging bands, packaging films for magnetic tape cassettes such as video tapes and audio tapes, packaging films for flexible discs, plate-making films, pressure-sensitive adhesive tapes, tapes, yarns, raising seedling pots, waterproof sheets, bags for sandbags, constructional films, weed control sheets and vegetation nets.

Examples

The present invention will be illustrated in further detail with reference to several examples below, which by no means limit the scope of the present invention.

Examples 1 to 11 and Comparative Examples 1 to 4

A series of resin compositions was prepared by incorporating any of Surfactants (1) to (9) relating to the present invention into a poly(lactic acid) resin (LACEA H-100; available from Mitsui Chemicals, Inc.) in proportions shown in Table 1 below. The resin compositions were melted and blended at 200° C. using the Labo Plastomill and a roller mixer (the product of Toyo Seiki Seisaku-Sho, Ltd.), were formed into sheets with 2 mm-thickness, 100 mm-length and 100 mm-width and thereby yielded molded articles according to Examples 1 to 11, respectively. A molded article prepared from the poly(lactic acid) resin not containing a surfactant was taken as Comparative Example 1. Molded articles prepared from the poly(lactic acid) resin incorporated with, instead of the surfactants relating to the present invention, the following nonionic surfactant [Comparative Compound (1)], cationic surfactants corresponding to the surfactants of General Formula (A) for use in the present invention, except with $X_1$ not satisfying the requirement in the present invention [Comparative Compound (2) and Comparative Compound (3)] were taken as Comparative Examples 2, 3 and 4, respectively.

Comparative Compound (1): Nonionic surfactant: glycerol monostearate (ANSTEX MG-100, the product of Toho Chemical Industry, Co., Ltd.)

Comparative Compound (2): Cationic surfactant

[Chemical Formula 13]

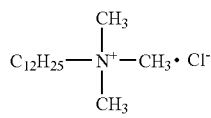

Comparative Compound (3): Cationic surfactant

[Chemical Formula 14]

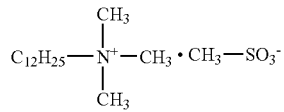

Examples 12 to 20

A series of resin compositions were prepared by subjecting poly(lactic acid) resin (LACEA H-100; available from Mitsui Chemicals, Inc.), any of the surfactants (1) to (3) for use in the present invention, and a compatibilizer in the proportions in Table 2 to melting and kneading in a twin-screw kneading extruder at a die temperature of 160° C. The resulting resin compositions were taken as Examples 12 to 20.

Test Example 1

The sheets according to Examples 1 to 11 and Comparative Examples 1 to 4 were left stand under conditions with constant temperature and humidity at a temperature of 23° C. and relative humidity of 50% for fourteen days, and the molecular weight retention, antistatic properties (specific surface resistance and half-life), antifogging properties, and transparency of the resulting sheets were determined. The determination methods are as follows. The results of determinations are shown in Table 1.

<Determination Methods>

The performance of the sheets were determined and evaluated by the following methods.

(1) Molecular Weight Retention (Mw)

The weight-average molecular weights in terms of polystyrene of the above-prepared sheets were calculated by and carrying out measurement using a chromatograph SCL-10 Avp (the product of Shimadzu Corporation) equipped with a chromatography column TSKgel SUPER HZM-M (the product of Tosoh Corporation) with chloroform as eluent, under conditions of a flow rate of 0.6 ml/min, a column temperature of 40° C., a sample concentration of 0.05 percent by weight and a sample amount of 50 µl using a detector RI. The standard polystyrenes used have weight-average molecular weights of 1090000, 706000, 355000, 190000, 96400, 37900, 19600, 10200, 5570, 2630, 870, and 500, respectively. The molecular weight retentions were determined according to the following calculation method.

Molecular weight retention=(Weight-average molecular weight of sample molded article)/(Weight-average molecular weight of material pellets)×100

The molecular weight retentions were evaluated according to the following criteria:
○ (excellent): molecular weight retention is more than 95%
Δ (good): molecular weight retention is 90% to 95%
X (poor): molecular weight retention is less than 90%

(2) Antistatic Property (Specific Surface Resistance)

The specific surface resistances of the molded sheets were determined in accordance with Japanese Industrial Standards (JIS) K-6911 using a super insulation resistance tester P-616 (the product of Kawaguchi Electric Works Co., Ltd.). A lower specific surface resistance means a more excellent antistatic property. The specific surface resistances (Ω) were evaluated according to the following criteria:
○ (excellent): specific surface resistance is less than 12
Δ (good): specific surface resistance is between 12 and 13
X (poor): specific surface resistance is more than 13

(3) Antistatic Property (Half-Life)

The discharging time periods (half-lives) of the molded sheets were determined by applying a voltage of 10 kV to a sample molded sheet and measuring the time period until the charge of the sheet became half of the saturated charge, using a STATIC HONESTMETER MODEL H0110 (the product of Shishido Seidenki K.K.). A shorter half-life means a more excellent antistatic property. The half-lives (second) were evaluated according to the following criteria:
○ (excellent): half-life is shorter than 15 seconds
Δ (good): half-life is between 15 seconds and 120 seconds
X (poor): half-life is longer than 120 seconds (4) Antifogging Property (Evaluation of Nondrip Property)

The antistatic properties of the sheets at low temperatures and at high temperatures were determined.

Low-temperature antistatic property: Water at 5° C. was placed in a beaker, and the beaker was lid with a sample biodegradable resin sheet. The wetting of the sheet at an outside temperature of 5° C. after six hours was evaluated.

High-temperature antistatic property: Water at 90° C. was placed in a beaker, and the beaker was lid with a sample biodegradable resin sheet. The wetting of the sheet at an outside temperature of 25° C. after thirty minutes was evaluated.

The antistatic properties were evaluated according to the following criteria:
 ⊚: entire sheet is homogeneously wet and transparent
 ◯: half or more of the sheet is transparent
 Δ: half or more of the sheet is opaque
 X: entire sheet is opaque (5) Transparency (ΔHAZE)

The haze of a sample sheet was determined using a haze meter (HAZEMETER TC-H III DPK, the product of Tokyo Denshoku Co., Ltd.), and the difference in haze (ΔHAZE) between the sample and a sheet incorporated with no surfactant was calculated. The transparency was evaluated by ΔHAZE. A smaller ΔHAZE means more excellent transparency nearer to that of the sheet incorporated with no surfactant.

which resin compositions according to Examples 12 to 20 were melted and kneaded, and were extruded as good strands from a twin screw kneader extruder at a die temperature of 160° C. Resin compositions comprising Surfactants (1) and (2) for use in the present invention but containing no compatibilizer were taken as Referential Examples 1 and 2, respectively, and a resin composition containing no surfactant but a compatibilizer alone was taken as Referential Example 3. The maximum amounts (percent by weight) were also determined on these referential examples by the same procedure as in Examples 12 to 20. The results are shown in Table 2. A higher maximum amount means higher compatibility with resins. The compatibility was evaluated according to the following criteria:

TABLE 1

| | Surfactant Number | Amount (percent by weight) | Molecular weight retention % | Antistatic properties | | | | Antifogging properties | | Transparency ΔHAZE (%) |
|---|---|---|---|---|---|---|---|---|---|---|
| | | | | Specific surface resistance LOG (Ω) | | Half-life second | | Low temperature | High temperature | |
| Ex. 1 | (1) | 0.05 | ◯ 98.5 | Δ | 12.9 | Δ | 25 | ◯ | Δ | 0.4 |
| Ex. 2 | (1) | 1.0 | ◯ 96.2 | ◯ | 11.2 | ◯ | 4 | ⊚ | ⊚ | 1.5 |
| Ex. 3 | (1) | 2.0 | ◯ 95.1 | ◯ | 10.3 | ◯ | 2 | ⊚ | ⊚ | 2.5 |
| Ex. 4 | (2) | 1.0 | ◯ 95.9 | ◯ | 11.5 | ◯ | 5 | ⊚ | ⊚ | 1.2 |
| Ex. 5 | (3) | 1.0 | ◯ 97.5 | ◯ | 11.6 | ◯ | 5 | ⊚ | ⊚ | 1.4 |
| Ex. 6 | (4) | 1.0 | ◯ 95.2 | ◯ | 11.9 | ◯ | 6 | ⊚ | ⊚ | 1.5 |
| Ex. 7 | (5) | 1.0 | ◯ 98.4 | ◯ | 11.6 | ◯ | 5 | ⊚ | ⊚ | 1.3 |
| Ex. 8 | (6) | 1.0 | ◯ 96.1 | ◯ | 11.9 | ◯ | 8 | ⊚ | ⊚ | 1.5 |
| Ex. 9 | (7) | 1.0 | ◯ 95.8 | ◯ | 11.5 | ◯ | 7 | ⊚ | ⊚ | 1.6 |
| Ex. 10 | (8) | 1.0 | ◯ 98.7 | ◯ | 11.8 | ◯ | 9 | ⊚ | ⊚ | 1.6 |
| Ex. 11 | (9) | 1.0 | ◯ 95.6 | ◯ | 11.7 | ◯ | 8 | ⊚ | ⊚ | 1.2 |
| Comp. Ex. 1 | — | 0.0 | ◯ 98.5 | X | 14.9 | X | more than 120 | X | X | 0.0 |
| Comp. Ex. 2 | Comp. Com. (1) | 1.0 | Δ 93.2 | X | 14.3 | X | more than 120 | X | X | 2.6 |
| Comp. Ex. 3 | Comp. Com. (2) | 1.0 | X 68.5 | X | 14.2 | X | more than 120 | X | X | 3.2 |
| Comp. Ex. 4 | Comp. Com. (3) | 1.0 | X 89.8 | Δ | 12.0 | Δ | 15 | Δ | Δ | 5.5 |

Test Example 2

In this test example, the maximum amounts (percent by weight) of surfactant compositions were determined, in ◯: maximum amount is more than 10 percent by weight
Δ: maximum amount is between 5 percent by weight and 10 percent by weight
X: maximum amount is less than 5 percent by weight

TABLE 2

| | (A) Surfactant Number | (B) Compatibilizer | Ratio of (A) to (B) (weight ratio) | Maximum amount (% by weight) | Compatibility |
|---|---|---|---|---|---|
| Ex. 12 | (1) | Reaction product between boric acid and glycerol monostearate | 10/90 | 20.0 | ◯ |
| Ex. 13 | (1) | Reaction product between boric acid and glycerol monostearate | 25/75 | 15.0 | ◯ |
| Ex. 14 | (1) | Reaction product between boric acid and glycerol monostearate | 50/50 | 10.0 | ◯ |
| Ex. 15 | (1) | Reaction product between boric acid and diglycerol dioleate | 75/25 | 7.0 | Δ |

TABLE 2-continued

| | (A) Surfactant Number | (B) Compatibilizer | Ratio of (A) to (B) (weight ratio) | Maximum amount (% by weight) | Compatibility |
|---|---|---|---|---|---|
| Ex. 16 | (1) | Reaction product between boric acid and sorbitan monostearate | 90/10 | 5.0 | Δ |
| Ex. 17 | (1) | Reaction product between boric acid and polyoxyethylene(5) sorbitan ether | 25/75 | 15.0 | ◯ |
| Ex. 18 | (1) | Reaction product between boric acid and polyoxyethylene(20) sorbitan monostearate | 50/50 | 10.0 | ◯ |
| Ex. 19 | (2) | Reaction product between boric acid and glycerol monostearate | 25/75 | 15.0 | ◯ |
| Ex. 20 | (3) | Reaction product between boric acid and polyoxyethylene(20) sorbitan monostearate | 50/50 | 10.0 | ◯ |
| Ref. Ex. 1 | (1) | — | 100/0 | 2.5 | X |
| Ref. Ex. 2 | (2) | — | 100/0 | 2.5 | X |
| Ref. Ex. 3 | — | Glycerol monostearate | 0/100 | 25.0 | ◯ |

Test Example 3

The master batches of the surfactant compositions containing the compatibilizers used in Examples 12 to 20 were dry-blended with a poly(lactic acid) resin (LACEA H-100) at dilution ratios shown in Table 3, were melted and mixed at 200° C. using the Labo Plastomill and a roller mixer (the product of Toyo Seiki Seisaku-Sho, Ltd.) to yield resins, and the resins were molded into sheets with 2 mm-thickness, 100 mm in length and 100 mm in width using a press machine. The sheets were left stand under conditions of constant temperature and humidity at a temperature of 23° C. and relative humidity of 50% for fourteen days. The molecular weight retention, antistatic properties (specific surface resistance and half-life), and antifogging properties of the resulting sheets were evaluated, and the results are shown in Table 3. The determination methods and criteria are as in Test Example 1. The term "amount (% by weight)" in Table 3 means the concentration in the molded sheet after dilution of the master batch.

antifogging properties of the molded articles were determined. The determination methods are the same as in Test Example 3.

Example 21-1

T-Die Extrusion

Pellets were prepared by melting and kneading a poly (lactic acid) [LACEA H-400 (trade name of the product of Mitsui Chemicals, Inc.)] and 10% by weight of a 25:75 (percent by weight) mixture of Surfactant (1) and the reaction product between boric acid and glycerol monostearate as a compatibilizer. The poly(lactic acid) H-400 as a biodegradable resin (10 kg) and the pellets (0.5 kg) were dry-blended and were molded into a sheet at a melting temperature of 210° C. to 230° C. using a T-die extruder equipped with a dehumidification dryer. The sheet has a thickness of 200 μm, a molecular weight retention of 96.8%, a specific surface resis-

TABLE 3

| | | Amount | | Antistatic properties | | | | Antifogging properties | |
|---|---|---|---|---|---|---|---|---|---|
| | Dilution ratio | (% by weight) | Molecular weight retention (%) | | Specific surface resistance LOG (Ω) | | Half-life (second) | Low temperature | High temperature |
| Ex. 12 | 1/20 | 1.0 | ◯ | 97.2 | ◯ | 11.9 | ◯ | 9 | ◯ | ◯ |
| Ex. 13 | 1/15 | 1.0 | ◯ | 96.9 | ◯ | 11.8 | ◯ | 8 | ◯ | ⊚ |
| Ex. 14 | 1/10 | 1.0 | ◯ | 96.7 | ◯ | 11.4 | ◯ | 6 | ⊚ | ⊚ |
| Ex. 15 | 1/7.5 | 1.0 | ◯ | 96.3 | ◯ | 11.3 | ◯ | 5 | ⊚ | ⊚ |
| Ex. 16 | 1/5 | 1.0 | ◯ | 96.0 | ◯ | 11.2 | ◯ | 4 | ⊚ | ⊚ |
| Ex. 17 | 1/30 | 0.5 | ◯ | 98.5 | ◯ | 11.9 | ◯ | 9 | ◯ | ⊚ |
| Ex. 18 | 1/20 | 0.5 | ◯ | 98.2 | ◯ | 11.7 | ◯ | 8 | ⊚ | ⊚ |
| Ex. 19 | 1/7.5 | 2.0 | ◯ | 96.2 | ◯ | 11.4 | ◯ | 6 | ⊚ | ⊚ |
| Ex. 20 | 1/5 | 2.0 | ◯ | 96.0 | ◯ | 11.1 | ◯ | 3 | ⊚ | ⊚ |

Test Example 4

A series of molded articles was prepared from a series of biodegradable resin compositions containing Surfactant (1) according to embodiments of the present invention by different molding processes. The antistatic properties (specific surface resistance and half-life), molecular weight retentions and tance of 12.3 and a half-life of 10 seconds. Next, the sheet was heated in an oven at set temperatures of 70° C. to 75° C. for one minute, was stretched 3.0 times in vertical direction and 3.0 times in crosswise direction, and was heated to 150° C., followed by heat setting at 150° C. for one minute. The resulting film has a thickness of 20 μm, a specific surface resistance of 11.9 and a half-life of 6 seconds. The stretched film was evaluated on antifogging properties to find that the entire film was homogeneously wetted and transparent both at low temperatures and at high temperatures.

Example 21-2

T-Die Extrusion

A sheet was prepared by the procedure of Example 12-1, except for using a poly(butylene terephthalate adipate) [Ecoflex (trade name of the product of BASF AG)] as a biodegradable resin, and using pellets prepared by melting and kneading Ecoflex and 10% by weight of a 50:50 (percent by weight) mixture of Surfactant (1) and the reaction product between boric acid and glycerol monostearate as a compatibilizer. The obtained sheet containing Ecoflex has a thickness of 200 μm, a molecular weight retention of 95.8%, a specific surface resistance of 12.7 and a half-life of 19 seconds. Next, the sheet was heated in an oven at set temperatures of 60° C. to 70° C. for one minute, was stretched 3.0 times in vertical direction and 3.0 times in crosswise direction, and was heated to 110° C., followed by heat setting at 110° C. for one minute. The resulting film has a thickness of 20 μm, a specific surface resistance of 12.1, and a half-life of 7 seconds. The stretched film was evaluated on antifogging properties to find that the entire film was homogeneously wetted and transparent both at low temperatures and at high temperatures.

Example 21-3

T-Die Extrusion

A sheet was prepared by the procedure of Example 12-1, except for using a poly(butylene succinate) [BIONOLLE #1010 (trade name of the product of Showa Highpolymer Co., Ltd.)] as a biodegradable resin, and using pellets prepared by melting and kneading BIONOLLE and 10% by weight of a 50:50 (percent by weight) mixture of Surfactant (1) and the reaction product between boric acid and glycerol monostearate as a compatibilizer. The obtained sheet containing BIONOLLE has a thickness of 200 μm, a molecular weight retention of 95.1%, a specific surface resistance of 12.5, and a half-life of 16 seconds. Next, the sheet was heated in an oven at set temperatures of 60° C. to 70° C. for one minute, was stretched 3.0 times in vertical direction and 3.0 times in crosswise direction, and was heated to 110° C., followed by heat setting at 110° C. for one minute. The resulting film has a thickness of 20 μm, a specific surface resistance of 12.3 and a half-life of 9 seconds. The stretched film was evaluated on antifogging properties to find that the entire film was homogeneously wetted and transparent both at low temperatures and at high temperatures.

Example 21-4

T-Die Extrusion

A sheet was prepared by the procedure of Example 12-1, except for using a poly(butylene succinate) [GS Pla (trade name of the product of Mitsubishi Chemical Corporation)] as a biodegradable resin, and using pellets prepared by melting and kneading GS Pla and 10% by weight of a 50:50 (percent by weight) mixture of Surfactant (1) and the reaction product between boric acid and glycerol monostearate as a compatibilizer. The sheet containing GS Pla has a thickness of 200 μm, a molecular weight retention of 96.1%, a specific surface resistance of 11.9 and a half-life of 15 seconds. Next, the sheet was heated in an oven at set temperatures of 60° C. to 65° C. for one minute, was stretched 3.0 times in vertical direction and 3.0 times in crosswise direction, and was heated to 110° C., followed by heat setting at 110° C. for one minute. The resulting film has a thickness of 20 μm, a specific surface resistance of 11.7 and a half-life of 9 seconds. The stretched film was evaluated on antifogging properties to find that the entire film was homogeneously wetted and transparent both at low temperatures and at high temperatures.

Example 22-1

Inflation Molding

Pellets were prepared by melting and kneading a poly (lactic acid) [LACEA H-100 (trade name of the product of Mitsui Chemicals, Inc.)] and 15% by weight of a 25:75 (percent by weight) mixture of Surfactant (1) and the reaction product between boric acid and glycerol monostearate as a compatibilizer. The poly(lactic acid) H-100 (5.0 kg), a poly (butylene succinate adipate) [BIONOLLE #3001 (trade name of the product of Showa Highpolymer Co., Ltd.)] (4.0 kg), both as a biodegradable resin, and the pellets (1.0 kg) were dry-blended, and the blend was molded into a tube with 225 mm in width and 30 μm in thickness using an inflation molding machine having a diameter of 30 mm equipped with a dehumidification dryer at a cylinder temperature of 150° C. to 180° C., a die temperature of 165° C. to 175° C., and a blow-up ratio of 2.3. The resulting film has a molecular weight retention of 98.1%, a specific surface resistance of 12.4, and a half-life of 22 seconds. The obtained film was evaluated on antifogging properties to find that the entire film was homogeneously wetted and transparent both at low temperatures and at high temperatures.

Example 22-2

Inflation Molding

A film was prepared by the procedure of Example 13-1, except for dry-blending 5.0 kg of a poly(lactic acid) [LACEA H-280 (trade name of the product of Mitsui Chemicals, Inc.)] and 4.0 kg of a poly(butylene terephthalate adipate) [Ecoflex (trade name of the product of BASF AG)] as biodegradable resins, and 1.0 kg of pellets prepared by melting and kneading H-280 and 15% by weight of a 50:50 (percent by weight) mixture of Surfactant (1) and the reaction product between boric acid and glycerol monostearate as a compatibilizer. The resulting film has a molecular weight retention of 97.7%, a specific surface resistance of 12.1 and a half-life of 19 seconds. The film was evaluated on antifogging properties to find that the entire film was homogeneously wetted and transparent both at low temperatures and at high temperatures.

Example 22-3

Inflation Molding

A film was prepared by the procedure of Example 13-1, except for dry-blending 5.0 kg of a poly(lactic acid) [LACEA H-280 (trade name of the product of Mitsui Chemicals, Inc.)] 4.0 kg of a poly(butylene succinate adipate) [GS Pla (trade name of the product of Mitsubishi Chemical Corporation)] as biodegradable resins and 1.0 kg of pellets prepared by melting and kneading H-280 and 15% by weight of a 50:50 (percent by weight) mixture of Surfactant (1) and the reaction product between boric acid and glycerol monostearate as a compatibilizer. The resulting film has a molecular weight retention of 96.9%, a specific surface resistance of 12.5 and a half-life of 22 seconds. The film was evaluated on antifogging properties to find that the entire film was homogeneously wetted and transparent both at low temperatures and at high temperatures.

Example 23

Injection Molding

A poly(lactic acid) [LACEA H-100 (trade name of the product of Mitsui Chemicals, Inc.)] as a biodegradable resin (10 kg) was mixed with 0.1 kg of Surfactant (1), and the mixture was melted and kneaded at 190° C. to 200° C. in a twin-screw extruder to thereby yield pellets. The pellets were injected and molded into a mold set at 30° C. to 40° C. using an injection molding machine equipped with a dehumidification dryer at a cylinder temperature of 140° C. to 220° C., a nozzle temperature of 170° C. to 190° C. Thus, a square sheet with 2 mm in thickness, 100 mm in length and 100 mm in width was prepared. The obtained square sheet has a molecular weight retention of 97.2%, a specific surface resistance of 12.4 and a half-life of 13 seconds.

Example 24

Drawing-Blowing

A poly(lactic acid) [LACEA H-100 (trade name of the product of Mitsui Chemicals, Inc.)] as a biodegradable resin (10 kg) was mixed with 0.05 kg of Surfactant (1), and the mixture was melted and kneaded at 190° C. to 200° C. in a twin-screw extruder to thereby yield pellets. The pellets were heated and melted at a cylinder temperature of 160° C. to 220° C. using an injection drawing/blowing machine equipped with a dehumidification dryer, were injected and molded into a mold set at 10° C. to 30° C. to thereby yield 40 g of a cold parison. The obtained parison was heated to 100° C. and softened, was transferred to a mold having a bottle shape, was blown and stretched 3.5 times in vertical direction and 3 times in longitudinal direction by blowing a pressurized air at a pressure of 1 Mpa to thereby yield a cylindrical bottle having a bore of 75 mm, a height of 100 mm and an inner capacity of 1000 ml. The body of the bottle was cut and subjected to determination of properties. The bottle has a wall thickness of 200 μm, a molecular weight retention of 97.3%, a specific surface resistance of 11.9 and a half-life of 8 seconds.

Example 25

Molding of Paper Laminate

A poly(lactic acid) [LACEA H-100 (trade name of the product of Mitsui Chemicals, Inc.)] as a biodegradable resin (10 kg) was mixed with 0.1 kg of Surfactant (1), and the mixture was melted and kneaded at 190° C. to 200° C. in a twin-screw extruder to thereby yield pellets. The pellets were kneaded and melted at 235° C. and extruded onto a craft paper having a mass per unit area of 75 g/m² at a winding speed of 120 m/min. using an extruder equipped with a dehumidification dryer and a T-die having a width of 1300 mm and a lip gap of 0.8 mm. In this procedure, the film-formability at that time was satisfactory without film-cutting. The paper laminate has a thickness in resin layer of 20±2 μm with good thickness precision (uniformity) and has a molecular weight retention of 95.1%, a specific surface resistance of 12.4 and a half-life of 20 seconds.

Example 26

Molding of Tape Yarn

A poly(lactic acid) [LACEA H-440 (trade name of the product of Mitsui Chemicals, Inc.)] as a biodegradable resin (10 kg) was mixed with 0.1 kg of Surfactant (1), and the mixture was melted and kneaded at 190° C. to 200° C. in a twin-screw extruder to thereby yield pellets. The pellets were formed into a film of 100 μm in thickness at temperatures of 150° C. to 210° C. using an extruder equipped with a dehumidification dryer and having a die width of 1200 m, a lip gap of 0.8 mm and a diameter of 90 mm. Next, the film was slit to a width of 6 mm, was stretched 6 to 8 times at temperatures of 65° C. to 80° C. by hot plate (hot tensile) stretching, and was subjected to heat setting on a hot plate at 100° C. to 120° C. The resulting tape has a width of 3.5 mm, a thickness of 30 μm, a strength of 5.1 g/d, a molecular weight retention of 95.9%, a specific surface resistance of 12.0 and a half-life of 7 seconds.

Example 27

Foam Molding

A poly(lactic acid) [LACEA H-280 (trade name of the product of Mitsui Chemicals, Inc.)] as a biodegradable resin (10 kg) was mixed with 0.1 kg of Surfactant (1), the mixture was melted and kneaded at 190° C. to 200° C. in a twin-screw extruder to thereby yield pellets. The pellets were dry-blended with 10 g of calcium stearate (the product of NOF Corporation) as a foaming aid and 10 g of talc (the product of Fuji Talc Industrial Co., Ltd.) using a Henschel mixer. The blend was foamed and molded at a cylinder temperature of 170° C. to 180° C. and a T-die temperature of 140° C. using a single-screw extruder equipped with a dehumidification dryer and having a diameter of 50 mm with a full flighted screw (L/D of 30), and a T-die having a die width of 650 mm and a land length of 10 mm, while injecting carbon dioxide. The resinous molten and kneaded product was discharged into the air from a slit and thereby yielded a foamed sheet 650 mm wide. The foamed sheet has an expansion ratio of 6.0 times and includes satisfactory cells with a cell diameter of 100 to 200 μm without variation in cell diameter. The foamed sheet has a molecular weight retention of 96.9%, a specific surface resistance of 12.4, and a half-life of 16 seconds.

Example 28

Molding of Nonwoven Fabric

A poly(lactic acid) [LACEA H-100 (trade name of the product of Mitsui Chemicals, Inc.)] as a biodegradable resin (10 kg) was mixed with 0.05 kg of Surfactant (1), and the mixture was melted and kneaded at 190° C. to 200° C. in a twin-screw extruder and was dried at 80° C. to thereby yield pellets. The pellets were heated and melted at 210° C., were subjected to melt spinning through a spinneret having ninety spin nozzles with a diameter of 0.35 mm, were drawn using an air sucker arranged 1300 mm below from the plane of the spinneret, and were built-up on a moving collecting face to form web. The drawing speed herein was about 3500 m/min. Next, the resulting web was heat-sealed by passing through between an embossed metal roll heated at temperatures of 80° C. to 100° C. and a flat metal roll heated at the same temperatures of 80° C. to 100° C. to thereby yield a nonwoven fabric. The resulting nonwoven fabric has a staple fineness of 2.5 deniers and a mass per unit area of 30 g/m². The nonwoven fabric has a molecular weight retention of 95.3%, a specific surface resistance of 12.0 and a half-life of 10 seconds.

The results of Examples 1 to 28 demonstrate that the biodegradable resins containing a specific surfactant or surfactant composition according to embodiments of the present invention are capable of maintaining their molecular weights and exhibiting excellent antistatic properties and antifogging properties. Molded articles prepared from these resins, such as films, sheets, injection-molded articles, filaments, nonwoven fabrics, bottles and yarns, are advantageously usable as a wide variety of materials such as (food) packaging materials, materials for agriculture, for the production of electric appliances and automobiles, materials for civil engineering/construction and fisheries, and compost materials.

The invention claimed is:

1. A biodegradable resin composition containing a surfactant represented by following Formula (A):

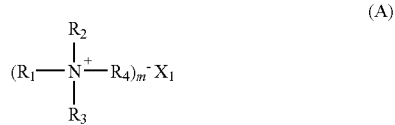

[wherein $R_1$, $R_2$, $R_3$ and $R_4$ are the same as or different from one another and each represent a straight- or branched-chain alkyl group, alkenyl group, hydroxyalkyl group, alkylaryl group, arylalkyl group, each of which has one to thirty carbon atoms, -$(A_1O)_f$—$R_a$ group (wherein $A_1$ represents an alkylene group having two to four carbon atoms; "f" denotes 1 to 50; and $R_a$ represents a straight- or branched-chain alkyl group, alkenyl group, hydroxyalkyl group or alkylaryl group, each of which has one to thirty carbon atoms) or a group represented by following Formula (A'):

(wherein $R_5$ represents a straight- or branched-chain alkyl group, alkenyl group, hydroxyalkyl group or alkylaryl group, each of which has one to thirty carbon atoms; $R_6$ represents an alkylene group having one to thirty carbon atoms; and $X_2$ represents —C(=O)NH—, —NHC(=O)—, —C(=O)O—, —OC(=O)— or —O—);

$X_1$ is represented by following Formula (B):

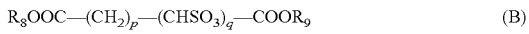

(wherein $R_8$ and $R_9$ are the same as or different from one another and each represent a straight- or branched-chain alkyl group, alkenyl group, hydroxalkyl group, alkylaryl group, each of which has one to thirty carbons atoms, -$(A_3O)_h$—$R_c$ group (wherein $A_3$ represents an alkylene group having two to four carbon atoms; "h" denotes 1 to 50; and $R_c$ represents a straight- or branched-chain alkyl group, alkenyl group, hydroxyalkyl group, and alkylaryl group, each of which has one to thirty carbon atoms), hydrogen atom, an alkali metal, an alkaline earth metal, ammonium or phosphonium (wherein $R_8$ and $R_9$ do not simultaneously represents hydrogen atoms, alkali metals, alkaline earth metals, ammoniums or phosphoniums); and "p" and "q" each represent an integer of 1 or more, and the total of "p" and "q" is an integer of 2 or more, and wherein the $CH_2$ group and $CHSO_3$ group may be arranged at random or in block); or $X_1$ is represented by following Formula (C):

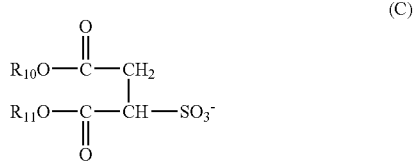

(wherein $R_{10}$ and $R_{11}$ are the same as or different from each other and each represent a straight- or branched-chain alkyl group, alkenyl group, hydroxyalkyl group, alkylaryl group, each of which has one to thirty carbon atoms, -$(A_4O)_i$—$R_d$ group (wherein $A_4$ represents an alkylene group having two to four carbon atoms; "i" denotes 1 to 50; and $R_d$ represents a straight- or branched-chain alkyl group, alkenyl group, hydroxyalkyl group, and alkylaryl group, each of which has one to thirty carbon atoms), hydrogen atom, an alkali metal, an alkaline earth metal, ammonium or phosphonium (wherein $R_{10}$ and $R_{11}$ do not simultaneously represent hydrogen atoms, alkali metals, alkaline earth metals, ammoniums or phosphoniums)); and "m" denotes an integer of 1 or more].

2. A biodegradable resin composition containing the surfactant represented by Formula (A) as defined in claim 1 and at least one compatibilizer selected from the following reaction products in a ratio of the former to the latter of 90:10 to 10:90 (percent by weight), on a basis of a total amount of the surfacent and the compatibilizer: reaction products between boric acid and one of monohydric alcohols, alkylphenols, polyhydric alcohols, and a mixture thereof (hereinafter these are referred to as "alcohols (b)"); reaction products between boric acid and fatty acid esters derived from the alcohols (b) and fatty acids; reaction products between boric acid and alkylene oxide adducts of the alcohols (b); and reaction products between boric acid and fatty acid esters derived from fatty acids and alkylene oxide adducts of the alcohols (b).

3. The biodegradable resin composition according to claim 2, wherein the polyhydric alcohols are selected from the group consisting of glycerol, diglycerol, polyglycerols, ethylene glycol, propylene glycol, sorbitol, sorbitan, pentaerythritol, trimethylolpropane, and sucrose.

4. The biodegradable resin composition according to claim 1, as a poly(lactic acid) resin composition.

5. A molded resinous article comprising the biodegradable resin composition according to claim 1.

6. The molded resinous article according to claim 5, as a film or sheet.

7. The molded resinous article according to claim 5, as an injection-molded article.

8. The molded resinous article according to claim 5, as a thermoformed article.

9. The molded resinous article according to claim 5, as a bottle.

10. A laminate comprising the biodegradeable resin composition as claimed in claim 1.

* * * * *